United States Patent Office 3,210,934
Patented Oct. 12, 1965

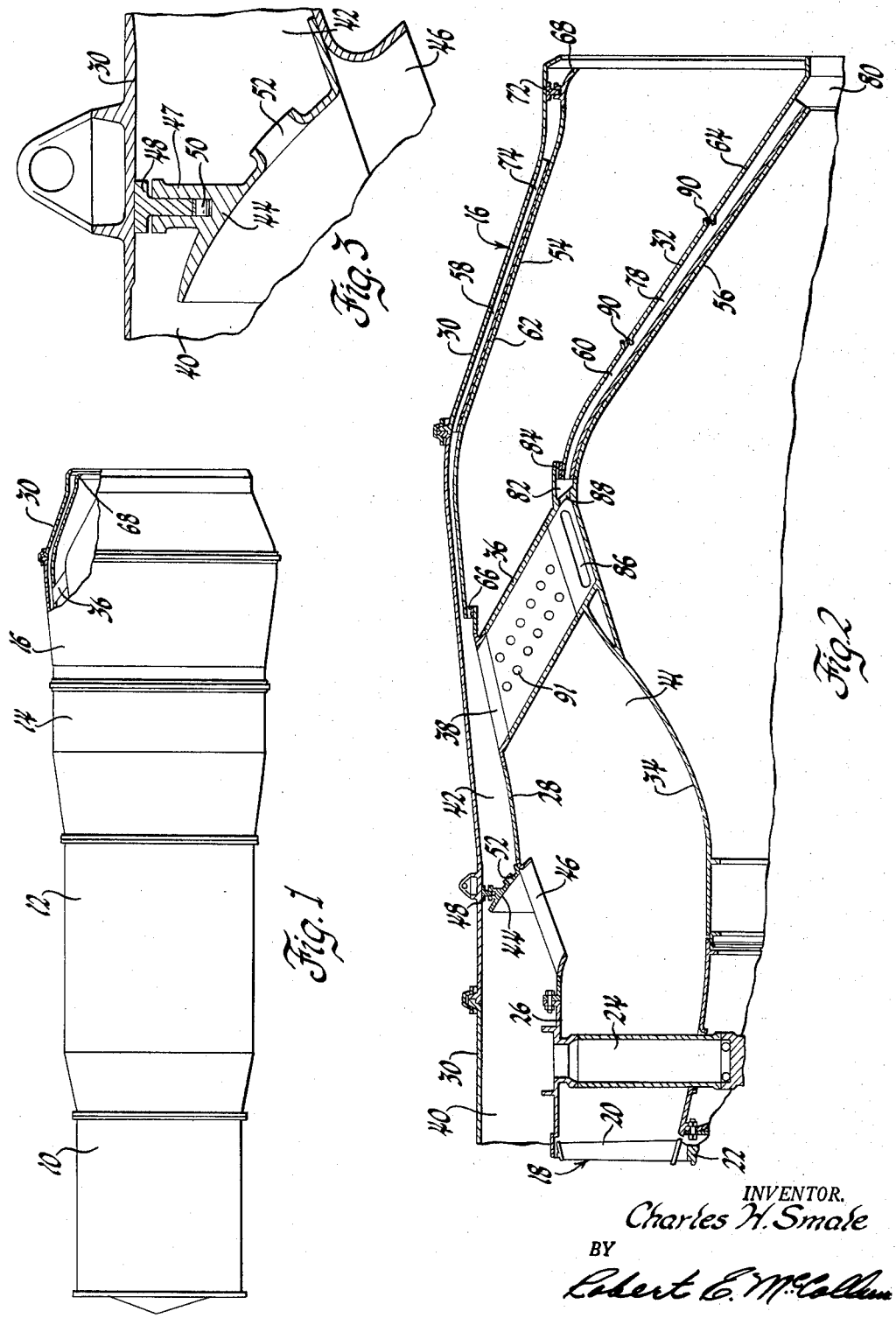

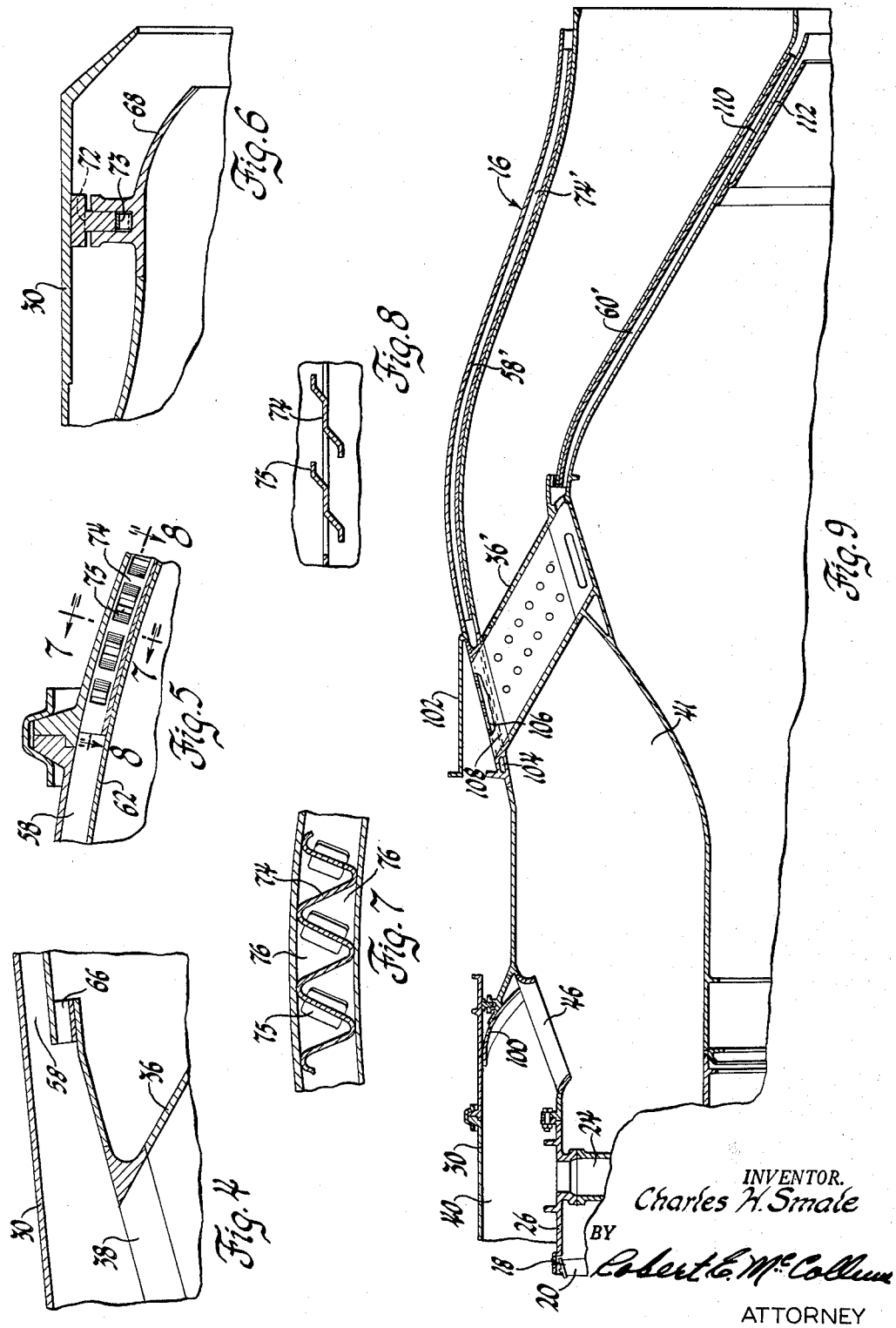

3,210,934
JET ENGINE EXHAUST
Charles H. Smale, Indianapolis, Ind., assignor to General Motors Corporation, Detroit, Mich., a corporation of Delaware
Filed Nov. 30, 1964, Ser. No. 416,952
10 Claims. (Cl. 60—35.6)

This application is a continuation-in-part of my application Serial No. 140,166, filed September 19, 1961 and now abandoned.

This invention relates to an exhaust duct and nozzle construction for a jet propelled engine, and more particularly to a construction suppressing infrared ray emission.

The successful flight of high altitude military aircraft, rockets, missiles, or the like, is dependent for a large part on their ability to remain undetected during flight. This includes decoying infrared seekers or anti-missile missiles. Infrared seekers are, in general, designed to seek out infrared wave lengths having high emission levels, that is, the shorter wave lengths. The hot metal parts of the turbine section and exhaust nozzle of a jet engine provide such wave lengths. Therefore, it is important that these hot parts be concealed from the seeker, and also that those parts that are visible be constructed so as to have a low infrared emission level, preferably equal to or lower than the emission level of adjacent bodies, such as the fuselage or nacelle of the aircraft. Since infrared signal strength varies as a function of temperature, cooling the hot parts of the exhaust nozzle visible to the seeker will reduce both the intensity and the frequency of maximum intensity radiation.

Therefore, this invention relates to a jet engine exhaust system suppressing infrared emission by providing a nozzle construction such that the engine parts having the highest emission level are not visible from the outlet end of the nozzle, and those hot parts that are visible have a low emission level.

It is, therefore, an object of the invention to provide a jet engine exhaust nozzle of a construction whereby the nozzle parts not concealed from detection by an infrared seeker have an infrared emissivity level equal to or lower than that of the surrounding environment of the engine, such as adjacent parts of the aircraft.

It is another object of this invention to provide a jet engine exhaust nozzle of a construction suppressing infrared ray emission and shielding the greatest source of infrared radiation from detection.

A further object of the invention is to provide a jet engine exhaust nozzle construction suppressing infrared emission of the surfaces visible to an infrared detector by means including a cooling system for the surfaces.

Other objects, features and advantages of the invention will become apparent upon reference to the succeeding detailed description of the invention and to the drawings illustrating the preferred embodiments thereof, wherein:

FIGURE 1 is a side elevation view of an engine embodying the invention, with parts broken away and in section;

FIGURE 2 is an enlarged cross sectional view of a portion of FIGURE 1;

FIGURES 3, 4, 5 and 6 are enlarged views of details of FIGURE 2;

FIGURE 7 is an enlarged cross sectional view taken on a plane indicated by and viewed in the direction of the arrows 7—7 of FIGURE 5;

FIGURE 8 is a cross sectional view taken on a plane indicated by and viewed in the direction of the arrows 8—8 of FIGURE 5; and FIGURE 9 is a cross sectional view of a modification of the FIGURE 2 construction.

As stated previously, the invention is primarily concerned with a jet engine exhaust nozzle construction suppressing infrared ray emission. The nozzle is of the plug type, and the plug has an enlargement upstream of its outlet to completely conceal the turbine section from view from the nozzle outlet regardless of the view angle. The walls of the exhaust passage between the turbine section and the plug enlargement are constructed to be dull to have a low reflectivity to prevent to a large extent the infrared emission from high temperature parts upstream from being reflected out the nozzle outlet. The walls of the exhaust passage downstream of the enlargement are of bright metal to have low emissivity levels. The passage walls at the plug enlargement change from a dull surface to bright at a point where the turbine section parts cannot be reflected out the nozzle outlet. The walls at and downstream of the enlargement are then cooled by either ambient ram air or engine bypass air to lower their emissivity levels to levels substantially equal to or lower than that of the engine environmental surrounding.

More specifically, the invention is illustrated schematically in FIGURE 1 in connection with a jet engine of the air breathing type, although it will be clear that it could be used in connection with other types of engines, such as solid fuel burning engines, for example. Engine 1 has a compressor section 10, a combustion section 12, a turbine section 14, and an exhaust nozzle 16, the construction of which forms the subject matter of this invention.

FIGURE 2 shows the downstream or aft portion of the engine of FIGURE 1 including the final stage of a turbine rotor assembly 18. Assembly 18 includes a row of circumferentially spaced turbine blades 20 secured to a turbine wheel 22 for rotation thereof. The turbine wheel is rotatably mounted upon a number of circumferentially spaced struts 24 through a bearing means, not shown, and the struts, only one of which is shown, are secured to the outer turbine casing 26. The details of the engine further upstream of the portion described are known and are immaterial for an understanding of the present invention, and therefore will not be explained in detail. Suffice it to say, however, that the engine combustion section delivers motive fluid to the turbine section to drive the blades and rotor assembly 18, which in turn drives a compressor drive shaft.

The exhaust nozzle 16 is a low expansion ratio plug type. It has a converging-diverging gas passage defined by the annulus between a flared extension 28 of the turbine outer casing, the outer engine casing 30, and a conical inner body or plug 32 mounted coaxially within the casings. The plug 32 is secured at its upstream end to the turbine bearing support struts 24 by suitable fairing 34. The radial spacing and support of the plug within the casings is maintained by a number of circumferentially spaced open end hollow struts 36. The struts are secured at their inner ends to the plug in a manner to be described later. Their outer ends are secured to the outer turbine casing extension 28 within spaced openings 38.

The engine illustrated is of the air bypass type and has an annular bypass passage or duct 40 between the turbine casing 26 and the engine casing 30. This bypass duct 40 normally feeds substantially all of the bypass air into a mixing chamber 41 at the nozzle inlet defined by the space between the plug periphery and turbine casing extension. However, in the particular embodiment shown in FIGURE 2, the bypass duct is extended to pass a small portion of the bypass air, which is substantially cooler than the exhaust gases, into the hollow struts 36 to cool the nozzle passage surfaces, as will be described later. The amount is maintained small to avoid too great a loss in thrust. To these ends, the turbine casing extension 28 is flared outwardly to join the engine casing 30, forming a tapering air annulus 42 between them. The air passages 40 and 42 are separated by an air deflecting or guide ring 44 which directs the main portion of the bypass air into the mixing chamber 41 through a number of circumferentially spaced openings 46 in the turbine casing extension.

As best seen in FIGURE 3, ring 44 is secured at its inner edge to the turbine casing extension and is formed near its outer edge with a grooved retainer 47 slidably mounted on a support ring 48. Ring 48 is suitably secured to the engine casing 30. A wave spring 50 between the rings maintains the parts in position while permitting relative thermal expansion between. The guide ring 44 has a number of orifices 52 to pass a controlled amount of air from main passage 40 into passage 42 to supply cooling air to struts 36, which also act as coolant ducts.

As thus far described, therefore, most of the bypass air is directed into the mixing chamber 41 to mix with the combustion product gases emanating from the turbine section and cool them a predetermined amount, with a small portion of bypass air being directed into passage 42 through orifices 52. The amount of cooling of the gases is controlled to provide the proper discharge temperature to obtain the greatest thrust, etc.

The outer and inner walls 54 and 56 of the diverging portion of the exhaust passage each have a double-walled construction with a hollow space or annulus 58 and 60 between. This permits a cooling fluid, in this case the bypass air, to be passed through each of the spaces to cool the nozzle surfaces 62 and 64 heated by contact with the exhaust gases. In general, the outer cooling annulus 58 receives its supply directly from passage 42, while the plug or inner body cooling annulus 60 is fed air from the hollow support struts 36.

More specifically, as best seen in FIGURE 4, the inlet end of the cooling annulus 58 is connected to the end of the turbine casing extension 28 by a circumferentially corrugated spacer 66. Spacer 66 radially separates the parts to permit bypass air to flow through the joint and wash the side of the surface 62 contacted by the exhaust gases. The opposite side of surface 62 is washed upon passage of air through the annulus 58. The outlet end of annulus 58 is joined to a conical nozzle throat member 68 slidably supported on the engine casing upon a ring 72. Ring 72 is apertured (dotted lines in FIGURE 6) to permit the flow of air out of the annulus. A wave spring 73 separates the two parts and allows for relative thermal expansion between.

The walls of the cooling annulus 58 are maintained radially separated over a major portion of its longitudinal extent by a circumferentially corrugated annular heat exchanging member 74 (FIGURES 2, and 5 through 8) dividing the annulus into a number of fluid channels 76. Each of the straight portions of member 74 has a number of slotted tabs 75 along its length that are bent out to form fins to increase the heat transfer ability of the heat exchanger 74.

Thus, cooling bypass air flows over both sides of the outer surface 62 of the exhaust passage by being fed simultaneously through spacer 66 and the outer annulus 58. The air then flows into and through the fluid passages 76 and out past the nozzle throat 68. The surface 62, heated by contact with the exhaust gases, is maintained cooled by the cooler bypass air absorbing the heat from the heat exchanger 74.

The plug or inner body cooling annulus 60 is, for the most part, constructed in a manner similar to outer annulus 58. That is, the annulus walls are separated by a circumferentially corrugated finned heat exchanger 78, and the annulus outlet terminates in a discharge duct 80. The inlet end of annulus 60 projects into the open edge of an annular manifold 82 formed as part of the throat portion of the plug or inner body. The cooling annulus 60 is separated from the manifold 82 by a circumferentially corrugated spacer 84. The ends of the hollow support struts 36 are received within and connected to manifold 82. Each of the struts is slotted on both sides at 86 and pierced at its downstream edges 88 to feed cooling air into the manifold. This air then flows out through the corrugated member 84 to flow across the surface of the wall 64 in contact with the exhaust gases, and also flows through the annulus 60 past the heat exchanger 78 to cool the opposite surface of wall 64. Wall 64 is provided with a number of spaced bleed ports or vents 90 to provide the required flow area in this converging area of the plug, as well as to additionally wash the outer surface of the wall with cool air. Thus, both the inner and outer nozzle passage walls 62 and 64 are cooled by the bypass air. The ducts 36 may also be apertured or not as desired, as shown at 91, to provide a controlled cooling of the outer surface of the ducts.

The temperature of the combustion products in the turbine section may be 1400° F., for example, with the bypass air at 300° F. and the air in the mixing chamber 41 at approximately 800° F. A problem eliminated by this construction is that of the boundary layer of hot gases normally on the nozzle surfaces. Without cooling, and assuming the use of the same material for the entire exhaust passage, the inner walls of the nozzle passage have a thin boundary layer of gases at turbine exit temperature (1400° F.) adhering to them so that the nozzle exit surfaces 62 and 64 are as hot as the hot metal parts in the turbine section. Since infrared radiation strength varies as a function of the temperature, the emissivity level of surfaces 62 and 64 will be increased to a high value.

The flow of cool air through spacers 66 and 84 not only washes away these boundary layers, but also helps cool the surfaces 62 and 64 so that together with the cooling of the surfaces by the flow of air through annuli 58 and 60, the infrared emissivity levels of these surfaces will be lowered substantially. The amount of cooling is controlled so that the emissivity levels are reduced to levels equal to or lower than that of the environmental surroundings of the engine. Detection of the aircraft is thereby rendered more difficult.

As stated previously, the nozzle is constructed so that the hot metal parts in the turbine section are concealed from view from the outlet end of the nozzle regardless of the view angle. Accordingly, as seen in FIGURE 2, the plug or inner body is constructed to have a maximum outer diameter at the throat of the exhaust passage slightly greater than either the diameter of the outlet opening of the nozzle at 68 or the outer diameter of the turbine outer casing 26 at the inlet to chamber 41. This sizing of the nozzle plug and casing and discharge area of the nozzle also reduces or limits the angle at which the visible nozzle surfaces in the diverging portion of the exhaust passage can be sensed.

Even though the infrared source is concealed, however, if the surfaces of the metal in chamber 41 where bright and highly reflective, they would reflect the infrared rays from the hot metal parts upstream out the nozzle outlet with the same emissivity intensity. Therefore, the surfaces of fairing 34, casing 26 and its extensions 28, and the inner wall of casing 30 defining the exhaust duct walls are roughened by vapor blasting or the like, or are otherwise treated so as to have a low reflectivity. The length of the exhaust passage inlet walls extending from a point adjacent the struts 24 to a point near the throat of the exhaust passage will therefore have a dull surface. The remaining portions of the exhaust passage defined by the surfaces 62 and 64 will be highly reflective so as to have low emissivity levels.

Therefore, the exhaust passage starts at the turbine section with a dull surface and proceeds downstream to a transition point near the enlargement or maximum diameter of the plug, where it changes to a bright surface of low emission level continuing to the outlet of the nozzle. The transition point between dull and bright surfaces will depend upon the particular construction, and will take place at a point where the infrared source will not be reflected out the nozzle. The outer surface of casing 30 will also be bright and have a high reflectivity and low emission level.

Although the invention is believed to be clear from the figures, a brief description of the operation is as follows. As shown in FIGURE 2, the combustion products emanating from the turbine section are mixed with most of the bypass air in the chamber 41 and pass out through the nozzle at high velocity to provide the desired thrust. The remaining portion of the bypass air is orificed into passage 42, and passes simultaneously into the outer cooling annulus 58 and through the fluid ducts 36 into the plug cooling annulus 60. The inner nozzle passage walls 62 and 64 are therefore cooled by the transfer of their heat from contact with the exhaust gases to the heat exchangers 74 and 78 and absorption of this heat by the bypass air. These walls are also cooled by the flow of bypass air through the corrugated spacers 66 and 84 over their adjacent surfaces. Furthermore, any boundary layer that would tend to pile up along these surfaces is swept or washed away by this flow through the spacers. Thus, the visible nozzle surfaces 62 and 64 are cooled to a temperature and emissivity level substantially equal to or lower than that of the engine environmental surroundings. The plug enlargement conceals the infrared source from a detector.

FIGURE 9 shows a modification of the FIGURE 2 embodiment wherein the cooling fluid is ambient ram air instead of the bypass air. Except for the construction necessary to adapt the FIGURE 2 embodiment to this change, the other details and operation of the nozzle remain the same and therefore will not be redescribed. In FIGURE 9, the air guide ring 100 completely closes off the end of the bypass duct instead of as shown in FIGURE 2 so that all of the bypass air is directed into the mixing chamber. Additionally, a ram air collector manifold 102 is secured to the engine outer casing with its upstream edge open to receive the ram air reduced to flow by the lower static pressure behind the jet nozzle. This air is then fed into an annular manifold 104 secured to the outer casing through a number of spaced holes 106 in the manifold outer wall. The inlet end of the outer cooling annulus 58' is fitted into the open edge of manifold 104 to flow the ram air through the heat exchanger 74. The outer open ends of ducts 36' are secured to and project through manifold 104 through suitable openings 108 in the manifold to receive the ram air. The radially iner wall of the plug cooling annulus 60' at its outlet end is apertured at 110 to bleed or vent air into another manifold 112 to prevent restriction of the flow area due to the plug converging.

From the foregoing, therefore, it will be seen that this invention provides an infrared emission suppression jet exhaust nozzle having all visible surfaces maintained at low emissivity and temperature levels at all times, these surfaces being highly reflective. The nonvisible surfaces near the infrared source are maintained dull to prevent the reflection of the infrared source out the jet nozzle with the same intensity as the source. It will also be seen that the angles from which the visible surfaces can be seen are narrow and the distance limited.

The arrangement disclosed for preventing direct radiation from the hot engine parts through the jet nozzle is the preferred one. However, it will be apparent that any tortuous configuration of the exhaust duct which conceals the two ends from each other would have this effect. For example, a right angle bend or an S-curve in the duct could block any direct line of sight from the outlet to the inlet of the exhaust duct.

While the invention has been illustrated in its preferred embodiments in connection with an aircraft or missile type engine, it will be clear to those skilled in the art to which this invention pertains that the invention will have use in many installations other than that illustrated, and that many modifications may be made thereto without departing from the scope of the invention.

I claim:

1. An infrared emission suppression exhaust fluid nozzle for a jet engine having at the inlet end of said nozzle an infrared radiation source with an emissivity level during the normal operation of said engine greater than the emissivity level of the engine environmental surroundings, comprising, a tubular engine casing having an inner body mounted coaxially within the casing, the maximum periphery of said inner body being sufficiently greater than the opening in the smaller end of said casing to prevent any viewing of said infrared source from the outlet end of said nozzle, and means to cool portions of the adjacent surfaces of said nozzle casing and inner body between the location of said maximum periphery and the outer end of said casing sufficiently to reduce their infrared emissivity level to a level comparable to that of the environmental surroundings of the engine, said casing and said inner body between the location of said maximum periphery and said inlet end being provided with surfaces of low reflectivity exposed to the exhaust fluid.

2. An infrared emission suppression exhaust fluid nozzle for a jet engine having at the inlet end of said nozzle an infrared radiation source with an emissivity level during the normal operation of said engine greater than the emissivity level of the engine environmental surroundings, comprising, a tubular engine casing having an inner body mounted coaxially within the casing, the maximum periphery of said iner body being sufficiently greater than the openning in the smaller end of said casing to prevent any viewing of said infrared source from the outlet end of said nozzle, and means to cool portions of the adjacent surfaces of said nozzle casing and inner body between the location of said maximum periphery and the outer end of said casing sufficiently to reduce their infrared emissivity level to a level comparable to that of the environmental surroundings of the engine, said casing and said inner body between the location of said maximum periphery and said outlet end being provided with surfaces of high reflectivity exposed to the exhaust fluid.

3. An infrared emission suppression exhaust fluid nozzle for a jet engine having at the inlet end of said nozzle an infrared radiation source with an emissivity level during the normal operation of said engine greater than the emissivity level of the engine environmental surroundings, comprising, a tubular engine casing having an inner body mounted coaxially within the casing, the maximum periphery of said inner body being sufficiently greater than the opening in the smaller end of said casing to prevent any viewing of said infrared source from the outlet end of said nozzle, and means to cool portions of the adjacent surfaces of said nozzle casing and inner body between the location of said maximum periphery and the outer end of said casing sufficiently to reduce their infrared emissivity level to a level comparable to that of the environmental surroundings of the engine, said casing and said inner body between the location of said maximum periphery and said inlet end being provided with surfaces of low reflectivity exposed to the exhaust fluid, said casing and said inner body between the location of said maximum periphery and said outlet end being provided with surfaces of high reflectivity exposed to the exhaust fluid.

4. An infrared emission suppression exhaust fluid nozzle for a jet engine having at the inlet end of said nozzle an infrared radiation source with an emissivity level during the normal operation of said engine greater than the emissivity level of the engine environmental surroundings, comprising, a tubular engine casing having an inner body mounted coaxially within the casing, the maximum periphery of said inner body being sufficiently greater than the opening in the smaller end of said casing to prevent any viewing of said infrared source from the opposite outlet end of said nozzle, and means to cool portions of the adjacent surfaces of said nozzle casing and inner body between the location of said maximum periphery and the outer end of said casing sufficiently to reduce their infrared emissivity level to a level comparable to that of the environmental surroundings of the engine, said casing and said inner body between the location of said maximum periphery and said inlet end being provided with surfaces of low reflectivity exposed to the exhaust fluid, said casing and said inner body between the location of said maximum periphery and said outlet end being provided with surfaces of high reflectivity exposed to the exhaust fluid, and means to wash portions of the surfaces of said inner body exposed to the exhaust fluid with fluid cooler than the exhaust fluid to reduce the infrared emissivity of said surfaces.

5. An infrared emission suppression exhaust fluid nozzle for a jet engine having at the inlet end of said nozzle an infrared radiation source with an emissivity level during the normal operation of said engine greater than the emissivity level of the engine environmental surroundings, comprising, a tubular engine casing having an inner body mounted coaxially within the casing, the maximum periphery of said inner body being sufficiently greater than the opening in the smaller end of said casing to prevent any viewing of said infrared source from the opposite outlet end of said nozzle, and means to cool portions of the adjacent surfaces of said nozzle casing and inner body between the location of said maximum periphery and the outer end of said casing sufficiently to reduce their infrared emissivity level to a level comparable to that of the environmental surroundings of the engine, said casing and said inner body between the location of said maximum periphery and said inlet end being provided with surfaces of low reflectivity exposed to the exhaust fluid, said casing and said inner body between the location of said maximum periphery and said outlet end being provided with surfaces of high reflectivity exposed to the exhaust fluid, and means to wash portions of the surfaces of said casing and said inner body exposed to the exhaust fluid with fluid cooler than the exhaust fluid to reduce the infrared emissivity of said surfaces.

6. An exhaust duct for an engine minimizing emission of infrared radiation, the duct having an inlet adjacent hot infrared-radiating parts of the engine and an outlet for gases discharged from the engine, the gases being confined by the interior surface of the duct, the outlet being spaced substantially from the inlet, the duct being of tortuous configuration such that the outlet and inlet are concealed from each other, thus blocking direct radiation from the said hot parts through the outlet, the duct comprising an upstream portion exposed to direct radiation from the hot parts and a downstream portion visible through the outlet, the interior of the upstream portion having a low reflectivity surface and the interior of the downstream portion having a low emissivity surface, and means to reduce the temperature of the downstream portion comprising means to introduce a film of relatively cool gas over the inner surface of the downstream portion and cooling heat exchange means on the outer side of the duct effective to cool the wall of the downstream portion of the duct.

7. An exhaust duct for an engine minimizing emission of infrared radiation, the duct having an inlet adjacent hot infrared-radiating parts of the engine and an outlet for gases discharged from the engine, the gases being confined by the interior surface of the duct, the outlet being spaced substantially from the inlet, the duct being of tortuous configuration such that the outlet and inlet are concealed from each other, thus blocking direct radiation from the said hot parts through the outlet, the duct comprising an upstream portion exposed to direct radiation from the hot parts and a downstream portion visible through the outlet, the interior of the upstream portion having a low reflectivity surface, and the interior of the downstream portion having a low emissivity surface.

8. An exhaust duct for an engine minimizing emission of infrared radiation, the duct having an inlet adjacent hot infrared-radiating parts of the engine and an outlet for gases discharged from the engine, the gases being confined by the interior surface of the duct, the outlet being spaced substantially from the inlet, the duct being of tortuous configuration such that the outlet and inlet are concealed from each other, thus blocking direct radiation from the said hot parts through the outlet, the duct comprising an upstream portion exposed to direct radiation from the hot parts and a downstream portion visible through the outlet, the interior of the upstream portion having a low reflectivity surface and the interior of the downstream portion having a low emissivity surface, and cooling means effective to reduce the temperature of the downstream portion.

9. An exhaust duct for an engine minimizing emission of infrared radiation, the duct having an inlet adjacent hot infrared-radiating parts of the engine and an outlet for gases discharged from the engine, the gases being confined by the interior surface of the duct, the outlet being spaced substantially from the inlet, the duct being of tortuous configuration such that the outlet and inlet are concealed from each other, thus blocking direct radiation from the said hot parts through the outlet, the duct comprising an upstream portion exposed to direct radiation from the hot parts and a downstream portion visible through the outlet, the interior of the upstream portion having a low reflectivity surface, and cooling means effective to reduce the temperature of the downstream portion.

10. An exhaust duct for an engine minimizing emission of infrared radiation, the duct having an inlet adjacent hot infrared-radiating parts of the engine and an outlet for gases discharged from the engine, the gases being confined by the interior surface of the duct, the outlet being spaced substantially from the inlet, the duct being of tortuous configuration such that the outlet and inlet are concealed from each other, thus blocking direct radiation from the said hot parts through the outlet, the duct comprising an upstream portion exposed to direct radiation from the hot parts and a downstream portion visible through the outlet, the interior of the downstream portion having a low emissivity surface, and cooling means effective to reduce the temperature of the downstream portion.

References Cited by the Examiner

UNITED STATES PATENTS

| | | | |
|---|---|---|---|
| 2,620,623 | 12/52 | Imbert | 60—35.6 X |
| 2,811,827 | 11/57 | Kress | 60—39.66 X |
| 2,955,414 | 10/60 | Hausmann. | |
| 2,961,198 | 11/60 | Stevens. | |
| 3,024,606 | 3/62 | Adams et al. | |

FOREIGN PATENTS

| | | |
|---|---|---|
| 469,231 | 11/50 | Canada. |
| 768,041 | 5/55 | Germany. |

SAMUEL LEVINE, *Primary Examiner.*

UNITED STATES PATENT OFFICE
CERTIFICATE OF CORRECTION

Patent No. 3,210,934

October 12, 1965

Charles H. Smale

It is hereby certified that error appears in the above numbered patent requiring correction and that the said Letters Patent should read as corrected below.

Column 5, line 46, for "reduced" read -- induced --; line 53, for "74" read -- 74' --; column 6, line 38, for "iner" read -- inner --; line 39, for "openning" read -- opening --.

Signed and sealed this 21st day of June 1966.

(SEAL)
Attest:

ERNEST W. SWIDER
Attesting Officer

EDWARD J. BRENNER
Commissioner of Patents